United States Patent [19]

Okuda

[11] Patent Number: 5,700,080
[45] Date of Patent: Dec. 23, 1997

[54] VEHICULAR LAMP

[75] Inventor: Tadayuki Okuda, Shizuoka, Japan

[73] Assignee: Koito Manufacturing Co., Ltd., Tokyo, Japan

[21] Appl. No.: 580,185

[22] Filed: Dec. 28, 1995

[30] Foreign Application Priority Data

Jan. 10, 1995 [JP] Japan ............... P.HEI.7-017431

[51] Int. Cl.⁶ .................................. F21V 29/00
[52] U.S. Cl. ............. 362/80; 362/61; 362/294; 362/373; 362/800; 340/479
[58] Field of Search ............... 362/61, 80, 80.1, 362/294, 373, 800, 216, 217, 219, 223, 235, 236; 340/479

[56] References Cited

U.S. PATENT DOCUMENTS

| 4,405,974 | 9/1983 | Quiogue ............... 362/294 |
| 4,630,182 | 12/1986 | Moroi et al. ............... 362/294 |
| 4,658,339 | 4/1987 | Tammerijn ............... 362/373 |
| 4,724,515 | 2/1988 | Matsuki et al. ............... 362/294 |
| 4,831,501 | 5/1989 | Okamoto et al. ............... 362/294 |
| 4,845,600 | 7/1989 | Matsumura et al. ............... 362/80 |
| 4,937,710 | 6/1990 | Hurley et al. ............... 362/294 |
| 4,972,303 | 11/1990 | Machida et al. ............... 362/80 |
| 5,062,027 | 10/1991 | Machida et al. ............... 362/80.1 |
| 5,207,497 | 5/1993 | Kamishina et al. ............... 362/294 |
| 5,367,438 | 11/1994 | Deslandres ............... 362/373 |
| 5,497,308 | 3/1996 | Ohtsuka et al. ............... 362/294 |
| 5,541,821 | 7/1996 | Murakami ............... 362/294 |

FOREIGN PATENT DOCUMENTS 1201894  8/1970  United Kingdom ............... 362/294

Primary Examiner—Thomas M. Sember
Attorney, Agent, or Firm—Sughrue, Mion, Zinn, Macpeak & Seas, PLLC

[57] ABSTRACT

A vehicular lamp has a lamp body defining therein a lamp chamber, and a light source disposed in the lamp body. An air communication hole is formed in a back plate of the lamp body for producing an air communication passage between a lamp chamber and the air outside of the lamp. An encircle wall which defines the air communication hole projects inward with respect to the lamp chamber.

22 Claims, 7 Drawing Sheets

VEHICULAR LAMP

BACKGROUND OF THE INVENTION

1. Field of the Invention

The present invention relates generally to a vehicular lamp having an air communication hole. More particularly, the invention relates to a novel vehicular lamp in which an encircle wall defining an air communication hole formed in a lamp body projects inward with respect to a lamp chamber, so that the lamp body has no projection portion.

2. Related Art

There has been known a conventional high-mount stop lamp mounted on a rear air-spoiler or the like of a vehicle such as an automobile for improving a visibility of the vehicle's braking condition to following cars.

FIG. 1 is a vertical sectional view of one example of the conventional high-mount stop lamp. The high-mount stop lamp a is constituted by a lamp body h formed of a synthetic resin, a back plate K, a lamp chamber n defined by the lamp body h and the back plate c, a printed substrate d securely disposed in the lamp chamber, a number of light-emitting diodes (LEDs) e installed on the printed substrate d.

The lamp body b, which is transparent having a specific color such as red, amber or white, has a rear opening g and a lens part f formed at a front part thereof (the direction of light illumination is herein regarded as a front direction). The back plate c formed of a synthetic resin is shaped like a plate and fixed to the lamp body b to thereby close the rear opening g of the lamp body b.

The back plate g is provided with a cylindrical member h protruding rearwardly, in which an air communication hole i is formed. A filter j covers a rear opening of the cylindrical member h. The filter j is mounted on and secured to the cylindrical member h by mounting a tube member k onto the cylindrical member h so that the filter j is sandwiched between the cylindrical member h and the tube member k.

The air communication hole 1 is formed for preventing the inside of the lamp chamber from collecting moisture. That is, if no air communication hole is formed in the lamp body, water or dew would enter the lamp chamber from the outside the lamp body through a hole for the electric connection code or the like which undesirably allows the inside of the lamp chamber to collect moisture especially when the lamp is turned off which causes negative pressure in the lamp chamber.

As shown in FIG. 1, a rear air-spoiler 1 (drawn by two dotted line in FIG. 1) is formed at a lower part, except for left and right end parts thereof, with a concave portion m for receiving the high-mount stop lamp a.

According to the conventional lamp thus provided, since the cylindrical member h for defining the air communication hole i projects rearwardly from the back plate c, the structural design of the vehicle body at the part for mounting thereon the lamp is so limited. That is, the concave portion m of the rear air-spoiler 1, for example, which receives the high-mount stop lamp a must necessarily be designed taking into account the configuration of the cylindrical member h and the projecting length thereof. In other words, the configuration of the rear air-spoiler 1 cannot be freely designed. This is a problem. Incidentally, the protruding cylindrical member h may be easily damaged during the assembly of the lamp.

SUMMARY OF THE INVENTION

The present invention was made in view of the problems accompanying the conventional vehicular lamp as described above. Accordingly, an object of the invention is to provide a vehicular lamp having an air communication hole formed In a lamp body for producing an air communication passage between the outside air surrounding the lamp and a lamp chamber, In which an encircle wall for defining an air communication hole projects inward with respect to the lamp chamber.

According to the present invention, since the encircle wall for defining the air communication hole projects inward with respect to the lamp chamber, there is no portion formed which protrudes outward so that the configuration of the vehicle body side can be freely designed. Further, there raises no fear of damaging the protruding portion because such is not formed.

DESCRIPTION OF THE PREFERRED EMBODIMENTS

The preferred embodiments of the present invention will now be described with reference to accompanying drawings. In the first, second and third embodiments described hereinafter, the present invention is applied, as an example, to a high-mount stop lamp for transmitting stop signals to the following car, whereas a fourth embodiment of the invention is applied to a vehicular headlamp.

FIGS. 2 through 6 show the first embodiment of the present invention which is applied to a high-mount stop lamp.

Figure 1:
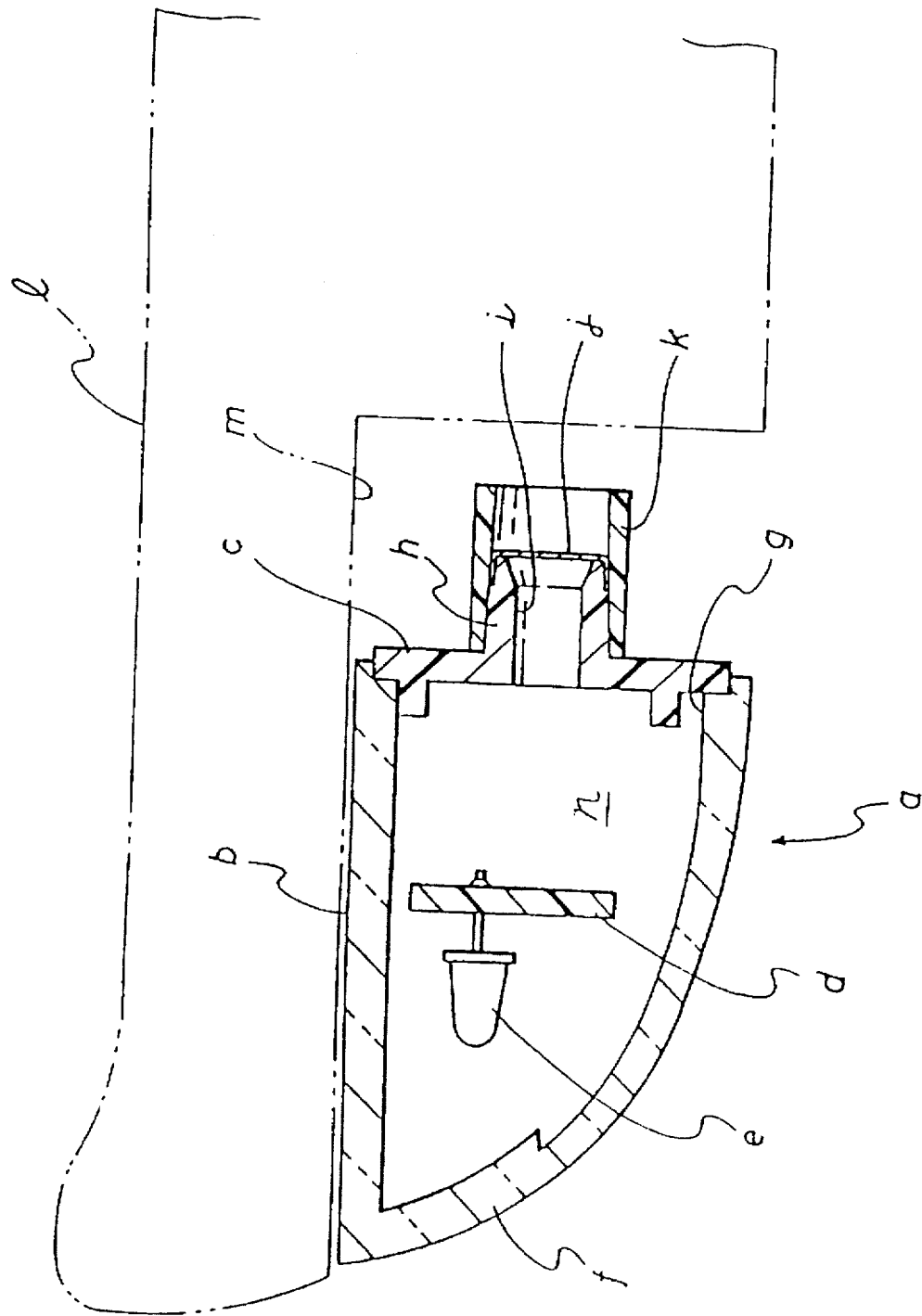
FIG. 1 is a vertical sectional view of one example of the conventional high-mount stop lamp.
Figure 2:
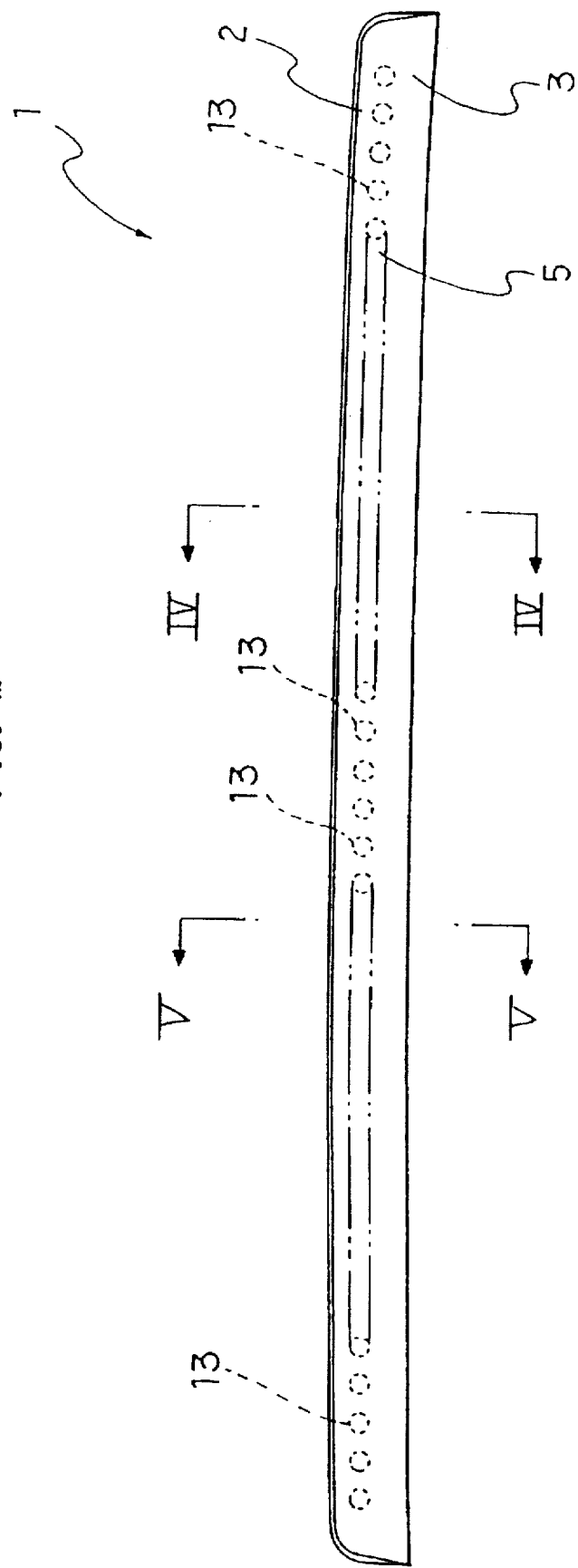
FIG. 2 is a front view of a first embodiment of a high-mount stop lamp to which the present invention is applied.
Figure 3:
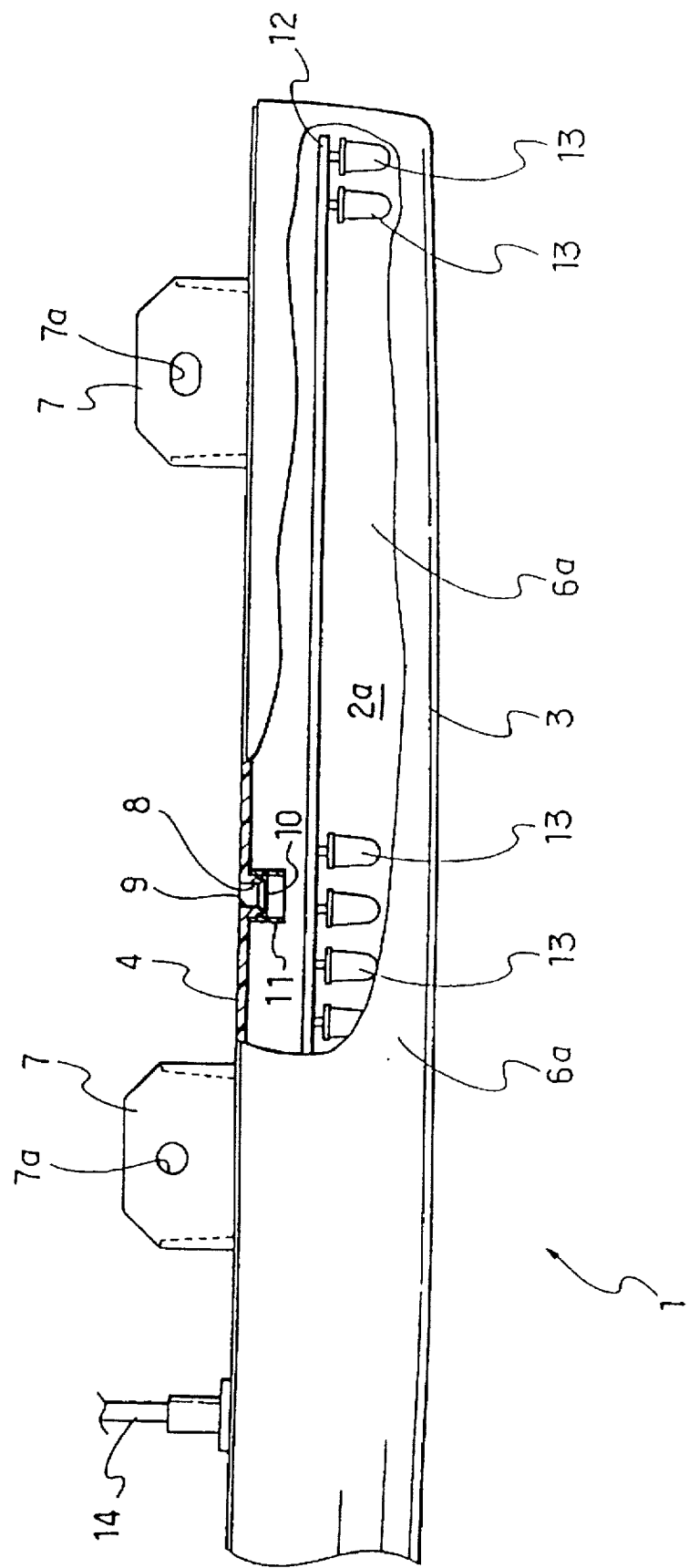
FIG. 3 is an essential plan view of the high-mount stop lamp shown In FIG. 2.

As best shown in FIG. 2, a high-mount stop lamp 1 is substantially rectangular when viewed from the front, which is elongated laterally. A lamp body 2 is provided with a main body 3 having a rear opening 3a which opens rearwardly (the direction of light illumination is regarded herein as a front direction), a back plate 4 for covering the rear opening 3a of the main body 3, and a lamp chamber 2a defined by the main body and the back plate 4.

The main body 3 is constituted by a front part performing as a lens part 5 and a peripheral wall part 6 protruding rearwardly from a peripheral edge of the lens part 5. The lens part 5 and the peripheral wall part 6 are integrally formed by a synthetic resin which is transparent having a specific color such as red, amber or white. The main body 3 is elongated laterally and bow-shaped in vertical cross section. That is, an upper surface 6a of the peripheral wall part 6 is flat while a bottom surface 6b is curved in such a manner that the bottom surface 6b is gradually curved upward while extending from the rear to the front.

The back plate 4 is provided with a base plate 4a which is a laterally elongated plate member and mounting members 7 projecting from a rear surface of the base plate 4a. The base plate 4a and the mounting members 7 are formed of a light-impermissible or opaque member and integrally formed with each other. The base plate 4a of the back plate 4 is ultrasonic fuse-bonded at a front peripheral edge thereof to the opening edge of the peripheral wall part 6. The mounting members 7 are flat plates and project rearwardly in parallel from a rear surface of the base plate 4a of the back plate 4 at a substantially center position in the lateral direction and the left and right positions thereof. Each of the mounting members 7 is formed at substantially the center thereof with a through hole 7a.

Figure 4:
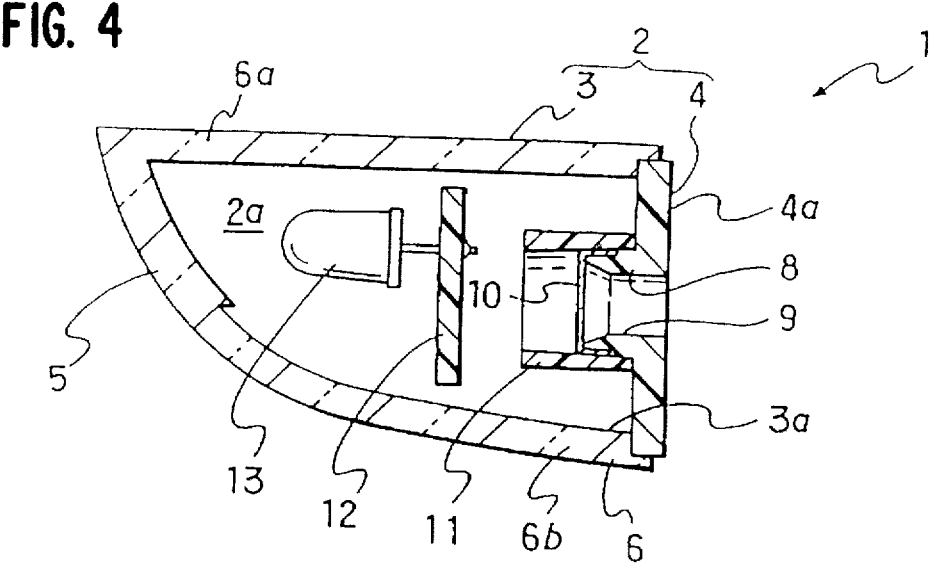
FIG. 4 is an enlarged sectional view of the high-mount stop lamp cut along lines IV—IV of FIG. 2.

As shown in FIG. 4, the back plate 4 is provided integrally with a cylindrical member 8 projecting inward with respect to the lamp chamber 2a. An air communication hole 9 defined in the cylindrical member 8 allows air communication between the lamp chamber 2a and the outside of the lamp thereby to prevent the surfaces inside the lamp chamber 2a from collecting moisture. Since the cylindrical member 8 projects inward with respect to the lamp chamber 2a, the dimension of the lamp in the front-rear direction can be reduced.

A filter 10 is mounted to the cylindrical member 8 to cover the opening thereof, so that water, dust and the like is prevented from entering the lamp chamber 2a. When the lamp is assembled, the filter 10 is put on the opening of the cylindrical member 8 and, under this condition, a tube member 11 formed of a synthetic resin is mounted on the cylindrical member 8 so that the filter 10 is sandwiched by the cylindrical member 8 and the tube member 11.

A web-like printed substrate 12 installed in the lamp chamber 2a is laterally elongated with a narrow vertical width. A number of light emitting diodes (LEDs) 13 are arrayed on a front surface of the printed substrate 12 at a predetermined interval in the lateral direction thereof. The printed substrate 12 is secured to the lamp body 2 by screw-connection by a boss 30 projecting frontward from the back plate 4 as shown in FIG. 6.

Figure 5:
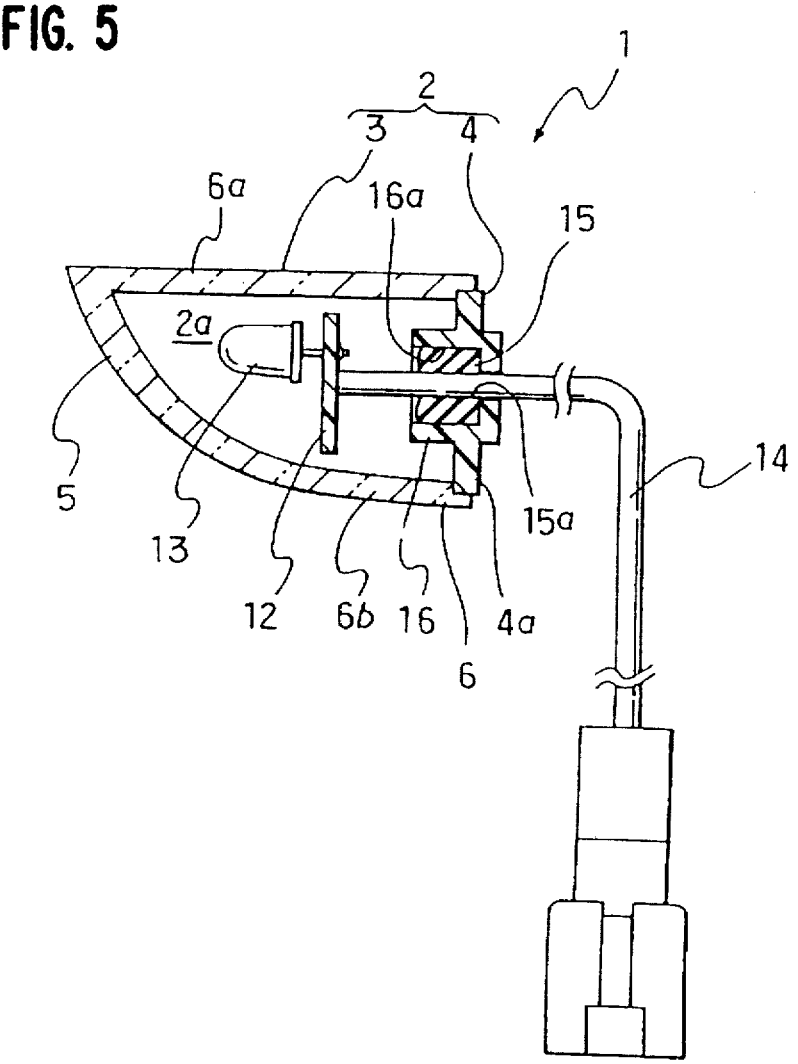
FIG. 5 is an enlarged sectional view of the high-mount stop lamp cut along lines V—V of FIG. 2.

As shown in FIG. 5, a connection wire 14 accomplishes the electric connection of the printed substrate 12 to the lighting circuit disposed outside the lamp (not shown). That is, an end of the connection wire 14 connects to a printed conductor disposed on the printed substrate 12 and the other end is drawn out of the lamp chamber 2a through a bushing 15 made of rubber. The bushing 15 is press-fitted in a concave portion 16a which directs to the lamp chamber and formed in a cylindrical portion 16 protruding frontward from the back plate 4. The connection wire 14 passes through a through hole 15a formed in a center part of the bushing 15.

Figure 6:
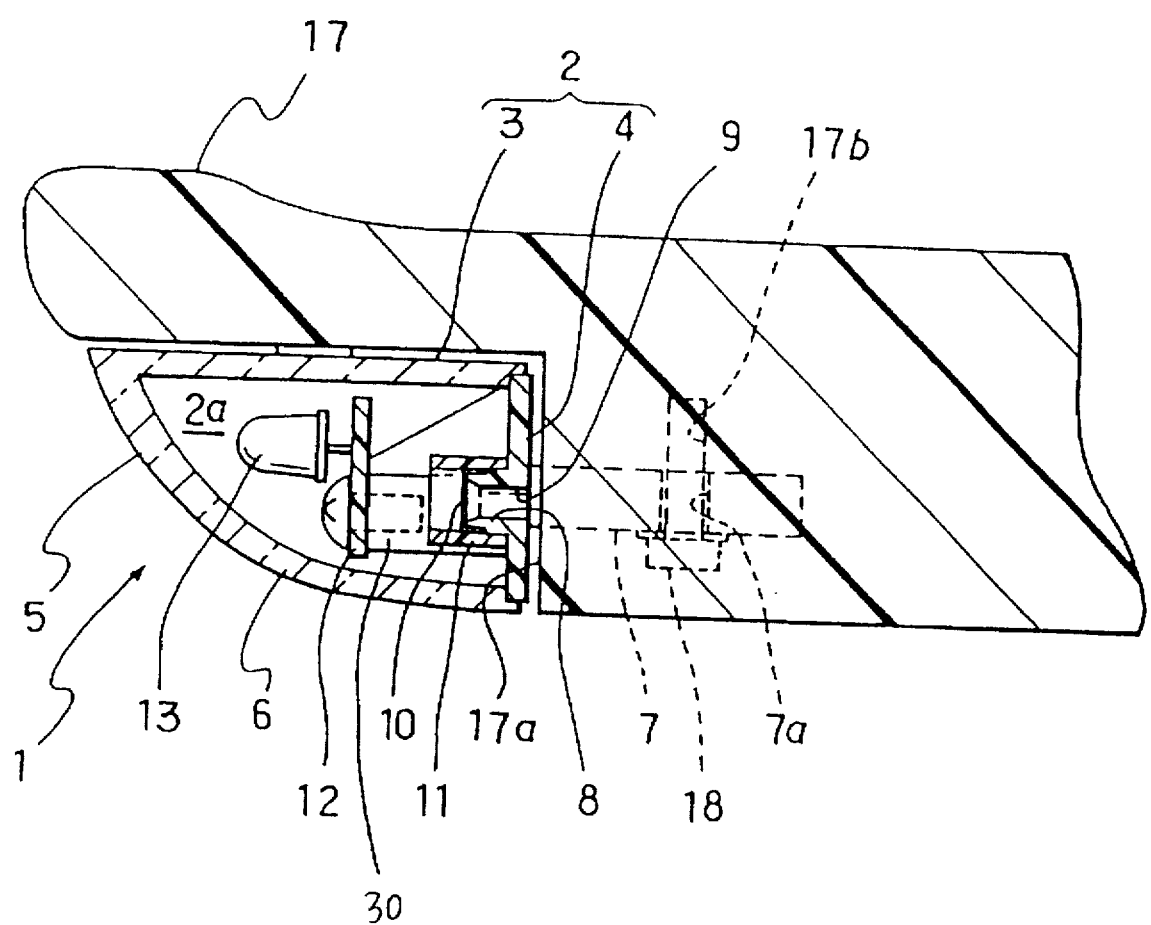
FIG. 6 is a sectional view of the high-mount stop lamp mounted on a rear air-spoiler.

A rear air-spoiler 17 of the vehicle body is, as shown in FIG. 6, formed at a lower part except for the left and rear ends thereof with a concave part 17a for receiving the lamp. The high-mount stop lamp 1 is secured to the rear air-spoiler 17 in such a manner that the high-mount stop lamp 1 is positioned in the concave part 17a, and then screws 18 are passed through the mounting members 7 of the mounting members 7 and engaged with screw holes 17b formed in the rear air-spoiler 17.

As described above, according to the high-mount stop lamp 1 to which the present invention is applied, since the cylindrical member 8 does not protrudes rearwardly, but rather projects inward with respect to the lamp chamber 2a, the high-mount stop lamp 1 does not interfere with any part of the rear air-spoiler 17. Therefore, there is no necessity to form on the rear air-spoiler 17 any part for receiving a protruded cylindrical member.

Figure 7:
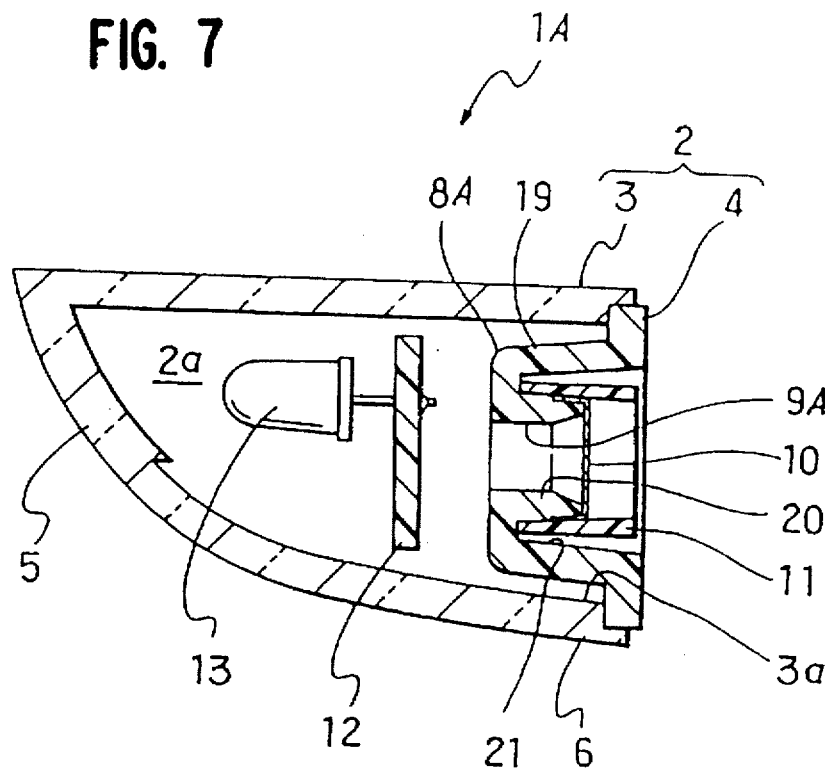
FIG. 7 is an enlarged sectional view showing a second embodiment of the present invention which is applied to a high mount stop lamp.

FIG. 7 shows a high-mount stop lamp 1A according to a second embodiment of the present invention. In the second embodiment, most of parts are the same as those of the first embodiment described above except for portions relating to the air communication hole and, accordingly, like parts or members are designated by the same reference numerals and a detailed description thereof is omitted here.

As shown in FIG. 7, an encircle wall 8A for defining an air communication hole 9A is formed with an outer peripheral wall 19 projecting frontwardly from the back plate 4 and an inner cylindrical wall 20 which is integrally formed with the outer peripheral wall 19 by bending a front edge thereof inwardly to be directed rearward. A concave portion 21 is defined between the outer peripheral wall 19 and the inner cylindrical wall 20. Owing to this structure, the lamp chamber 2a is allowed to communicate with the outside through the air communication hole 9A.

When the lamp is assembled, the filter 10 is put on the opening of the inner cylindrical wall 20 and, in this condition, the tube member 11 is mounted on the inner cylindrical wall 20 so that the filter 10 is sandwiched by the inner cylindrical wall 20 and the tube member 11. During the assembly, the tube member 11 is mounted on the inner cylindrical wall 20 so that a rear edge of which does not project from a rear surface of the back plate 4.

According to the high-mount stop lamp 1A of the second embodiment of the invention, the filter 10 can be exchanged easily by removing the tube member 11 without removing the back plate 4 from the main body 3 of the lamp body 2.

Figure 8:
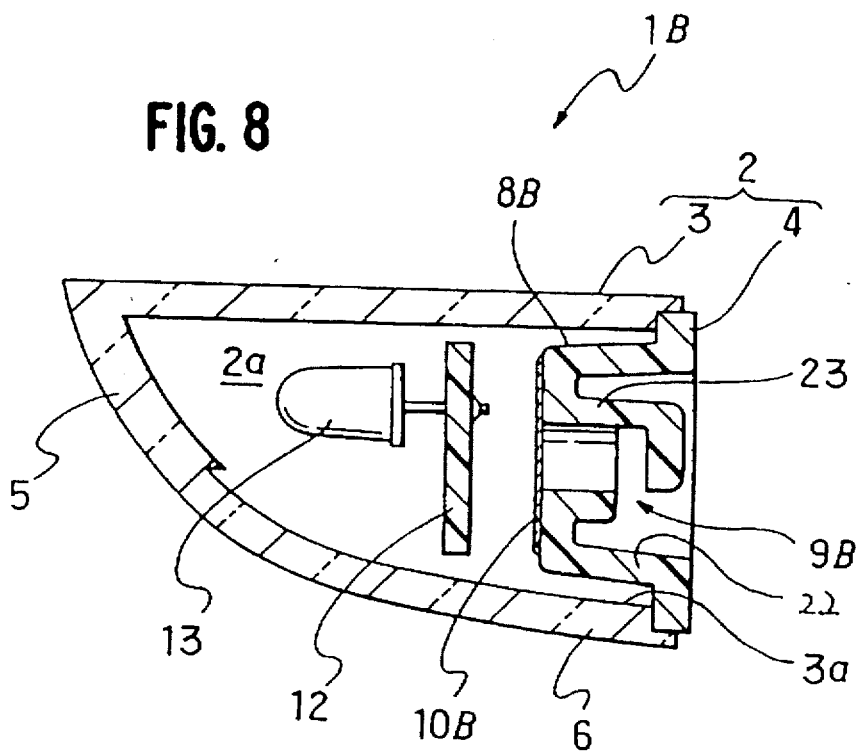
FIG. 8 is an enlarged sectional view showing a third embodiment of the present invention which is applied to a high mount stop lamp.

FIG. 8 shows a high-mount stop lamp 1B according to a third embodiment of the present invention. In the third embodiment, similar to the second embodiment, most of parts are the same as those of the first embodiment described above except for portions relating to the air communication hole and, accordingly, like parts or members are designated by the same reference numerals and a detailed description thereof is omitted here.

As shown in FIG. 8, an air communication passage 9B is defined in a zig-zag or circuition path by an encircle wall 8B which is formed with an outer peripheral wall 22 projecting frontwardly from the back plate 4 and an inner peripheral wall 23 which is integrally formed with the outer peripheral wall 22 by bending a front edge thereof inwardly to be directed rearward. Thus, the air communication passage 9B, which is defined by the inner peripheral wall 23 like a trap, allows the lamp chamber 2a to communicate with the air outside of the lamp. Incidentally, a filter 10B is adhered to a front end of the outer peripheral wall 22.

According to the high-mount stop lamp 1B of the third embodiment of the invention, water, dust and the like are effectively prevented from entering the lamp chamber 2a owing to the zig-zag air communication passage 9B and the filter 10B.

According to the first, second and third embodiments, the present invention is applied to a high-mount stop lamp. Thanks to the structure of the high-mount stop lamp, the air communication hole or passage and the inwardly projecting cylindrical member are hidden by the printed substrate 12 installed in the lamp chamber 2a when viewing from the front. Accordingly, the external appearance is not deteriorated.

Other than the high-mount stop lamps, the present invention may also be applied to other vehicular lamps such as a headlamp and a rear-combination lamp in which a reflector is disposed separately from a lamp body.

Figure 9:
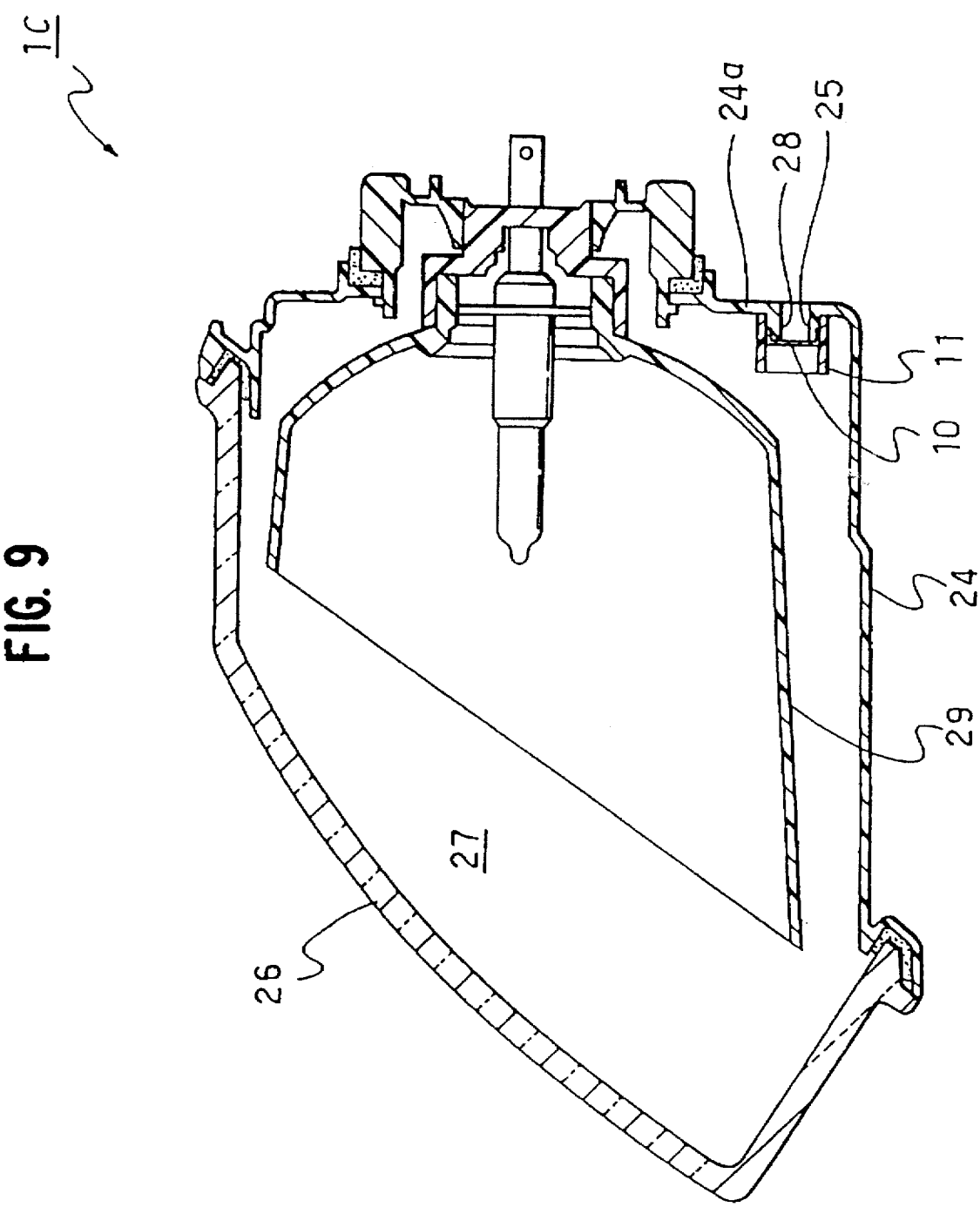
FIG. 9 is a vertical sectional view of a vehicular headlamp to which the present invention is applied.

FIG. 9 is a vertical sectional view of a vehicular headlamp to which the present invention is applied. As shown in FIG. 9, a lamp body 24 formed of synthetic resin is provided with a cylindrical member 25 formed on a back wall 24a thereof. The cylindrical member 25 projects inward with respect to a lamp chamber 27 defined by a front lens 26 and the lamp body 24, and an air communication hole 28 encircled by the cylindrical member 25 allows the lamp chamber 27 to communicate with the air outside of the lamp. When the filter is assembled, the filter 10 is put on the opening of the cylindrical member 25 from the lamp chamber 27 side and, in this condition, the tube member 11 is mounted on the cylindrical member 25 so that the filter 10 is sandwiched by the cylindrical member 25 and the tube member 11. As shown in FIG. 9, the air communication hole 28 is hidden by a reflector 29 disposed in the lamp chamber 27.

As described above, according to the present invention, since the encircle wall for defining the air communication hole projects inward with respect to the lamp chamber, no portion which protrudes outward is formed, so that the configuration of the vehicle body side can be freely designed. Further, there is no fear of damaging such a protruding portion because it is not formed. Furthermore, because the filter is mounted on the cylindrical member to cover the opening thereof, water, dust or the like can be prevented from entering the lamp chamber.

When the present invention is applied to a high-mount stop lamp, the projecting encircle wall is hidden by the printed substrate so that the external appearance is not deteriorated. On the other hand, when the present invention is applied to a headlamp or a rear-combination lamp, the projecting encircle wall is hidden by the reflector disposed separately from the lamp body so that the external appearance of the lamp is not deteriorated.

It should be understood that the form of the invention herein shown and described is to be taken as a preferred example of the invention and that various changes in the shape, size and arrangement of parts may be resorted to without departing from the spirit of the invention or the scope of the appended claims. For example, the cylindrical member may be circular, rectangular, or polygonal in cross section.

What is claimed is:

1. A vehicular lamp, comprising:
a lamp body including a wall;
a lamp chamber defined by said lamp body;
a light source disposed in said lamp chamber;
an encircle wall formed on said wall of said lamp body, said encircle wall opening to said lamp chamber and to air outside of the lamp, said encircle wall projecting inward with respect to said lamp chamber, with no portion of said encircle wall projecting exteriorly beyond said wall of said lamp body; and
an air communication path defined by said encircle wall communicating said lamp chamber with the air outside of the lamp,
wherein said encircle wall comprises an outer peripheral wall projecting frontwardly from the wall of said lamp body toward a lens part of said lamp body, and an inner peripheral wall which is integrally formed with said outer peripheral wall by bending a front edge thereof inwardly to be directed rearward away from said lens part.

2. The vehicular lamp according to claim 1, wherein a rear end of at least a part of said inner peripheral wall is bent substantially perpendicular with respect to said inner peripheral wall, and said air communication path is formed in a circuitous path.

3. The vehicular lamp according to claim 2, further comprising a filter attached to a front edge of said outer peripheral wall.

4. The vehicular lamp according to claim 1, further comprising a filter disposed on a rear opening of said inner cylindrical wall and a tube member mounted on said inner cylindrical wall through said filter.

5. The vehicular lamp according to claim 4, wherein said tube member is formed of synthetic resin.

6. The vehicular lamp according to claim 1, wherein said light source comprises at least one light emitting diode.

7. The vehicular lamp according to claim 1, further comprising a reflector disposed in said lamp chamber and separately from said lamp body, wherein said light source comprises a bulb mounted on said reflector.

8. The vehicular lamp according to claim 1, wherein said lamp body is a high-mount stop lamp body.

9. The vehicular lamp according to claim 1, wherein said lamp body is a headlamp body.

10. The vehicular lamp according to claim 1, wherein said lamp body is a rear-combination lamp body.

11. A vehicular lamp, comprising:
a lamp body including a wall;
a lamp chamber defined by said lamp body;
a light source disposed in said lamp chamber;
an encircle wall formed on said wall of said lamp body, said encircle wall opening to said lamp chamber and to air outside of the lamp, said encircle wall projecting inward with respect to said lamp chamber, with no portion of said encircle wall projecting exteriorly beyond said wall of said lamp body;
an air communication path defined by said encircle wall communicating said lamp chamber with the air outside of the lamp; and
a filter disposed on the opening of said encircle wall.

12. A vehicular lamp, comprising:
a lamp body including a wall;
a lamp chamber defined by said lamp body;
a light source disposed in said lamp chamber;
an encircle wall formed on said wall of said lamp body, said encircle wall opening to said lamp chamber and to air outside of the lamp, said encircle wall projecting inward with respect to said lamp chamber, with no portion of said encircle wall projecting exteriorly beyond said wall of said lamp body; and
an air communication path defined by said encircle wall communicating said lamp chamber with the air outside of the lamp,
wherein said lamp body comprises a main body having a rear opening and a back plate secured to said rear opening of said main body.

13. The vehicular lamp according to claim 12, wherein said back plate is ultrasonic fuse-bonded at a front peripheral edge thereof to a rear opening edge of said rear opening of said main body.

14. The vehicular lamp according to claim 13, wherein said main body is colored transparent.

15. The vehicular lamp according to claim 12, wherein said back plate comprises a plurality of mounting members projecting from a rear surface, each of said mounting members comprises a through hole.

16. The vehicular lamp according to claim 15, wherein said back plate and said mounting members are formed of an opaque material and integrally formed with each other.

17. The vehicular lamp according to claim 16, wherein said back plate is formed of synthetic resin.

18. The vehicular lamp according to claim 12, wherein said main body comprises a lens part at a front thereof.

19. The vehicular lamp according to claim 12, wherein said main body is formed of synthetic resin.

20. The vehicular lamp according to claim 12, wherein said main body is colored transparent.

21. A vehicular lamp, comprising:

a lamp body including a wall;

a lamp chamber defined by said lamp body;

a light source disposed in said lamp chamber, said light source comprising at least one light emitting diode;

an encircle wall formed on said wall of said lamp body, said encircle wall opening to said lamp chamber and to air outside of the lamp, said encircle wall projecting inward with respect to said lamp chamber, with no portion of said encircle wall projecting exteriorly beyond said wall of said lamp body;

an air communication path defined by said encircle wall communicating said lamp chamber with the air outside of the lamp; and a printed substrate disposed in said lamp chamber, wherein said light emitting diode is arrayed on said printed substrate.

22. A vehicular lamp, comprising:

a lamp body including a wall;

a lamp chamber defined by said lamp body;

a light source disposed in said lamp chamber;

an encircle wall formed on said wall of said lamp body, said encircle wall opening to said lamp chamber and to air outside of the lamp, said encircle wall projecting inward with respect to said lamp chamber, with no portion of said encircle wall projecting exteriorly beyond said wall of said lamp body;

an air communication path defined by said encircle wall communicating said lamp chamber with the air outside of the lamp; and an electric connection wire engaging with said light source, said connection wire being drawn out of said lamp body through a bushing fitted in said lamp body.

* * * * *